US006821102B2

United States Patent
Miyahara et al.

(10) Patent No.: US 6,821,102 B2
(45) Date of Patent: Nov. 23, 2004

(54) DRIVE CONTROL APPARATUS FOR AN INJECTION MOLDING MACHINE

(75) Inventors: Kiyoshi Miyahara, Nagano (JP); Tsuyoshi Arai, Nagano (JP); Takashi Magario, Nagano (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 0 days.

(21) Appl. No.: 10/163,347

(22) Filed: Jun. 7, 2002

(65) Prior Publication Data

US 2003/0003177 A1 Jan. 2, 2003

(30) Foreign Application Priority Data

Jun. 8, 2001 (JP) .......................................... 2001-173944

(51) Int. Cl.$^7$ .............................................. B29C 45/80
(52) U.S. Cl. ...................................... 425/136; 425/151
(58) Field of Search .................................. 425/136, 151

(56) References Cited

U.S. PATENT DOCUMENTS 6,520,761 B2 * 2/2003 Arai et al. ................... 425/136

FOREIGN PATENT DOCUMENTS

JP 10-296818 A 11/1998

* cited by examiner

*Primary Examiner*—Tim Heitbrink
(74) *Attorney, Agent, or Firm*—Birch, Stewart, Kolasch & Birch, LLP

(57) ABSTRACT

A drive control apparatus is used in an injection molding machine in order to drive and control a servomotor for moving a movable member. Among a plurality of functional sections which constitute a servo circuit connected to the servomotor, at least one functional section (e.g., a safety circuit section, etc.) selected as a functional section having a higher degree of importance is constituted by a hardware circuit section realized without use of software; and the remaining functional section or sections are constituted by a software circuit section realized by making use of software.

14 Claims, 4 Drawing Sheets

FIG.4

| OPERATION MODE | ROTATIONAL DIRECTION DETECTION SIGNAL | | DETECTION SIGNAL INDICATING SAFETY DOOR OPENED | OPEN/CLOSE SWITCH |
|---|---|---|---|---|
| MANUAL | MOLD CLAMPING (REGULAR ROTATION) | 1 | 1 (P – OT) | OFF |
| | | | 1 (N – OT) | ON |
| | MOLD OPENING (REVERSE ROTATION) | 0 | 1 (P – OT) | ON |
| | | | 1 (N – OT) | OFF |
| AUTOMATIC | MOLD CLAMPING (REGULAR ROTATION) | 1 | 1 (P – OT) | OFF |
| | | | 1 (P – OT) | ON |
| | MOLD OPENING (REVERSE ROTATION) | 0 | 1 (P – OT) | ON |
| | | | 1 (P – OT) | OFF |
| SEMI-AUTOMATIC NORMAL | MOLD CLAMPING (REGULAR ROTATION) | 1 | 1 (P – OT) | OFF |
| | | | 1 (P – OT) | ON |
| | MOLD OPENING (REVERSE ROTATION) | 0 | 1 (P – OT) | ON |
| | | | 1 (P – OT) | OFF |
| SEMI-AUTOMATIC OVERRIDE | MOLD CLAMPING (REGULAR ROTATION) | 1 | 1 (P – OT) | OFF |
| | | | 1 (P – OT) | ON |
| | MOLD OPENING (REVERSE ROTATION) | 0 | 1 (P – OT) | ON |
| | | | 0 (CANCEL) | ON |

P – OT: PROHIBITION OF REGULAR ROTATION
N – OT: PROHIBITION OF REVERSE ROTATION

DRIVE CONTROL APPARATUS FOR AN INJECTION MOLDING MACHINE

BACKGROUND OF THE INVENTION

1. Field of the Invention

The present invention relates to a drive control apparatus for an injection molding machine, which apparatus drives and controls a servomotor for moving a movable member such as a movable platen.

2. Description of the Relevant Art

Conventionally, there has been known a safety apparatus configured to stop operation of a servomotor for moving a movable member, such as a movable platen, of an injection molding machine when a safety door of the injection molding machine is opened (see, for example, Japanese Patent Application Laid-Open (kokai) No. 10 (1998)-296818).

For example, a safety apparatus of such a type operates as follows when used for a mold clamping apparatus. When a limit switch detects that a safety door is opened during movement of a movable platen toward a mold-closing direction, a detection signal that is output from the limit switch upon detection of the door being opened is fed to an over-travel terminal or zero clamp terminal of a servo circuit (servo amplifier) for driving and controlling a servomotor, to thereby quickly stop operation of the servomotor; i.e., movement of a movable platen (movable mold).

Meanwhile, the above-described conventional safety apparatus is realized by making use of a servo circuit (drive control apparatus). In many cases, a main portion of the servo circuit is realized by means of a software circuit section in order to perform various sophisticated control and processing functions at high speed and to cope with changes in specifications and upgrading. Therefore, operation of the above-described safety apparatus is also realized by a control program (software) included in the software circuit section.

Although such a software circuit section realized by means of software has the advantages as described above, the software circuit section may operate erroneously as a result of, for example, external noise. In addition, such a software circuit section may involve program bugs and may cause the CPU to fall out of control. Therefore, only a certain extent of safety and reliability of an injection molding machine has been secured.

SUMMARY OF THE INVENTION

An object of the present invention is to provide a drive control apparatus for an injection molding machine which is advantageously applied to a highly important functional section, such as a safety circuit section, of the injection molding machine in order to remarkably enhance safety and reliability of the injection molding machine, while maintaining merits attained through use of a software circuit section.

Another object of the present invention is to provide a drive control apparatus for an injection molding machine which is advantageously applied to a safety circuit section, which is a highly important functional section, in order to realize stop control of high response, as well as reliable stop control by mean of a dual system.

In order to achieve the objects as described above, the present invention provides a drive control apparatus used in an injection molding machine in order to drive and control a servomotor for moving a movable member, characterized in that among a plurality of functional sections which constitute a servo circuit connected to the servomotor, at least one functional section selected as a functional section having a higher degree of importance is constituted by a hardware circuit section realized without use of software; and the remaining functional section or sections are constituted by a software circuit section realized by making use of software.

An example of the functional section having a higher degree of importance includes a safety circuit section which detects that a safety door is opened and subsequently stops operation of the servomotor. The safety circuit section includes an open/close switch connected in series to a signal line which supplies a drive control signal to a power diver for supplying electricity to the servomotor; and a logic circuit which outputs a stop command signal upon receipt of a detection signal generated when the safety door is opened, and changes over the open/close switch by means of the stop command signal. The safety circuit section may include a delay circuit for changing over the open/close switch upon elapse of a predetermined delay time after the logic circuit has output the stop command signal.

BRIEF DESCRIPTION OF THE DRAWINGS

FIG. 4 is a truth table associated with the operation of the drive control apparatus

DETAILED DESCRIPTION OF THE PREFERRED EMBODIMENTS

An embodiment of the present invention will next be described in detail with reference to the drawings. The accompanying drawings are illustrative of the embodiment and are not meant to limit the scope of the invention. In order to describe the invention clearly, detailed description of known features is omitted.

First, the configuration of a drive control apparatus 1 according to the present embodiment will be described with reference to FIG. 1.

Figure 1:
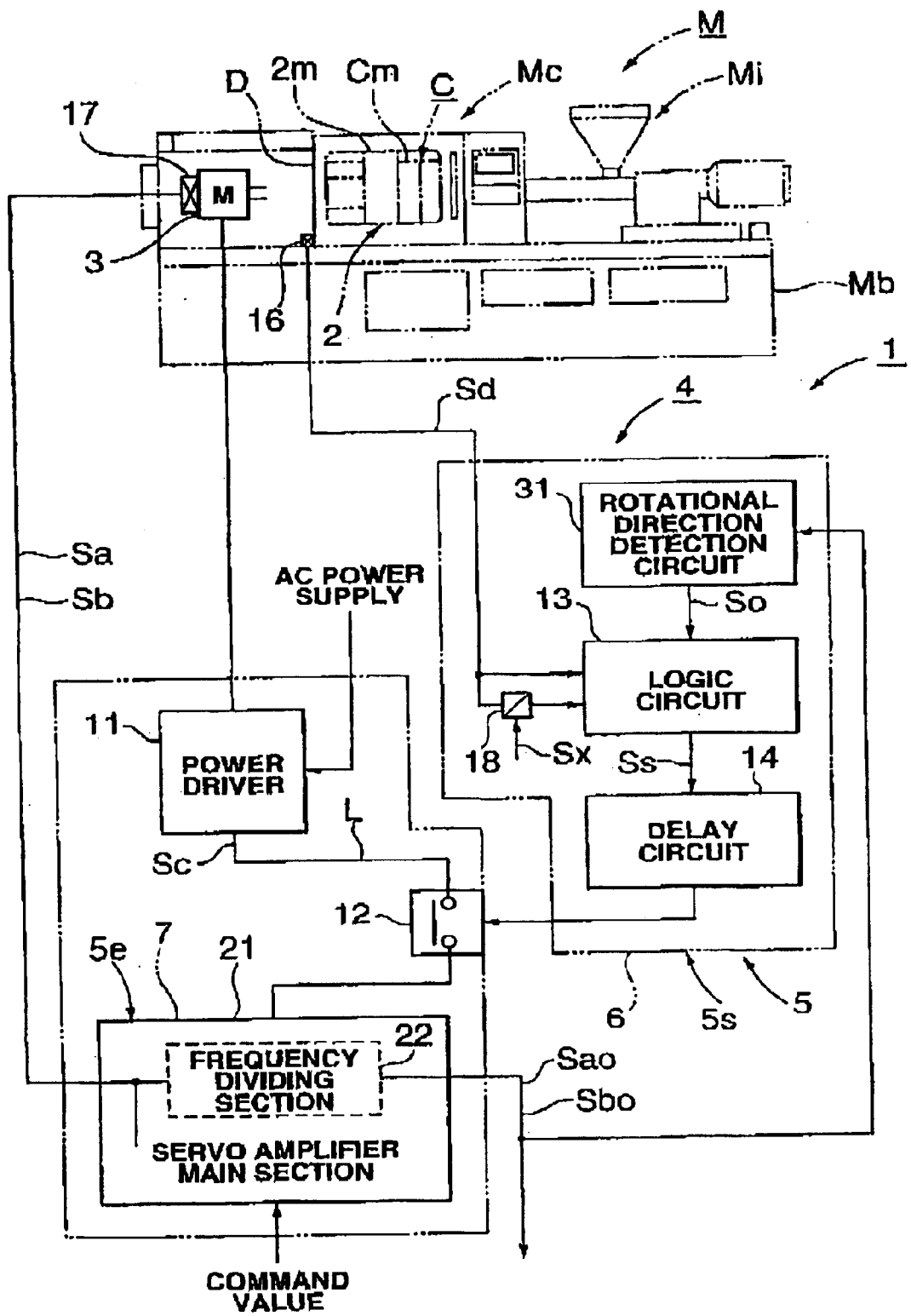
FIG. 1 is a block diagram of a drive control apparatus according to an embodiment of the present invention.

An injection molding machine M indicated by an imaginary line in FIG. 1 includes an injection apparatus Mi disposed on a machine base Mb, and a mold clamping apparatus Mc, to which a mold unit C is attached. The mold clamping apparatus Mc includes a drive mechanism which uses a servomotor 3 for advancing and retracting a movable platen 2m (movable member 2), to which a movable mold Cm of the mold unit C is attached. The mold clamping apparatus Mc is provided with a safety door D and a limit switch 16 for detecting that the safety door D is opened. In FIG. 1, the safety door D is shown in a closed state, and can be opened by being slid leftward in FIG. 1.

The mold clamping apparatus Mc includes the drive control apparatus 1 for driving and controlling the servomotor 3. The drive control apparatus 1 includes a servo circuit 4. The servomotor 3, a rotary encoder 17 attached to the servomotor 3 so as to detect rotation thereof, and the limit switch 16 are connected to the servo circuit 4.

The servo circuit 4 constitutes a main portion of the present invention. In general, the servo circuits 4 consists of a plurality of functional sections 5, 5e, etc. The plurality of functional sections 5, 5e, etc. are classified in accordance with degree of importance. In the servo circuit 4 of the present embodiment, a safety circuit section 5s for detecting that the safety door D is opened and for stopping operation of the servomotor 3 is classified as a functional section 5 having a higher degree of importance, and a servo amplifier main section 21 is classified as a remaining functional section 5e.

The servo amplifier main section 21 is constituted by a software circuit section 7 realized by making use of software. The servo amplifier main section 21 includes a CPU, various types of memories, and other components, and stores a control program (software) therein. The servo amplifier main section 21 has a computer function for performing various types of control and processing on the basis of the computer program. Further, the servo amplifier main section 21 includes a frequency dividing section 22. The frequency dividing section 22 has a function of dividing two pulse signals; i.e., a phase A pulse signal Sa and a phase B pulse signal Sb, supplied from the rotary encoder 17, respectively. Moreover, the servo amplifier main section 21 is connected to an unillustrated central controller. Command values and other data are supplied from the central controller to the servo amplifier main section 21.

Reference numeral 11 denotes a power driver for supplying electricity to the servomotor 3. An AC power source is connected to the power driver 11. The power driver 11 includes a rectification section, a smoothing section, power transistors, and other components. The power driver 11 is connected to the servo amplifier main section 21 via an open/close switch 12, which will be described later. The above configuration enables the servo amplifier main section 21 to supply a drive control signal Sc to the power driver 11.

Figure 2:
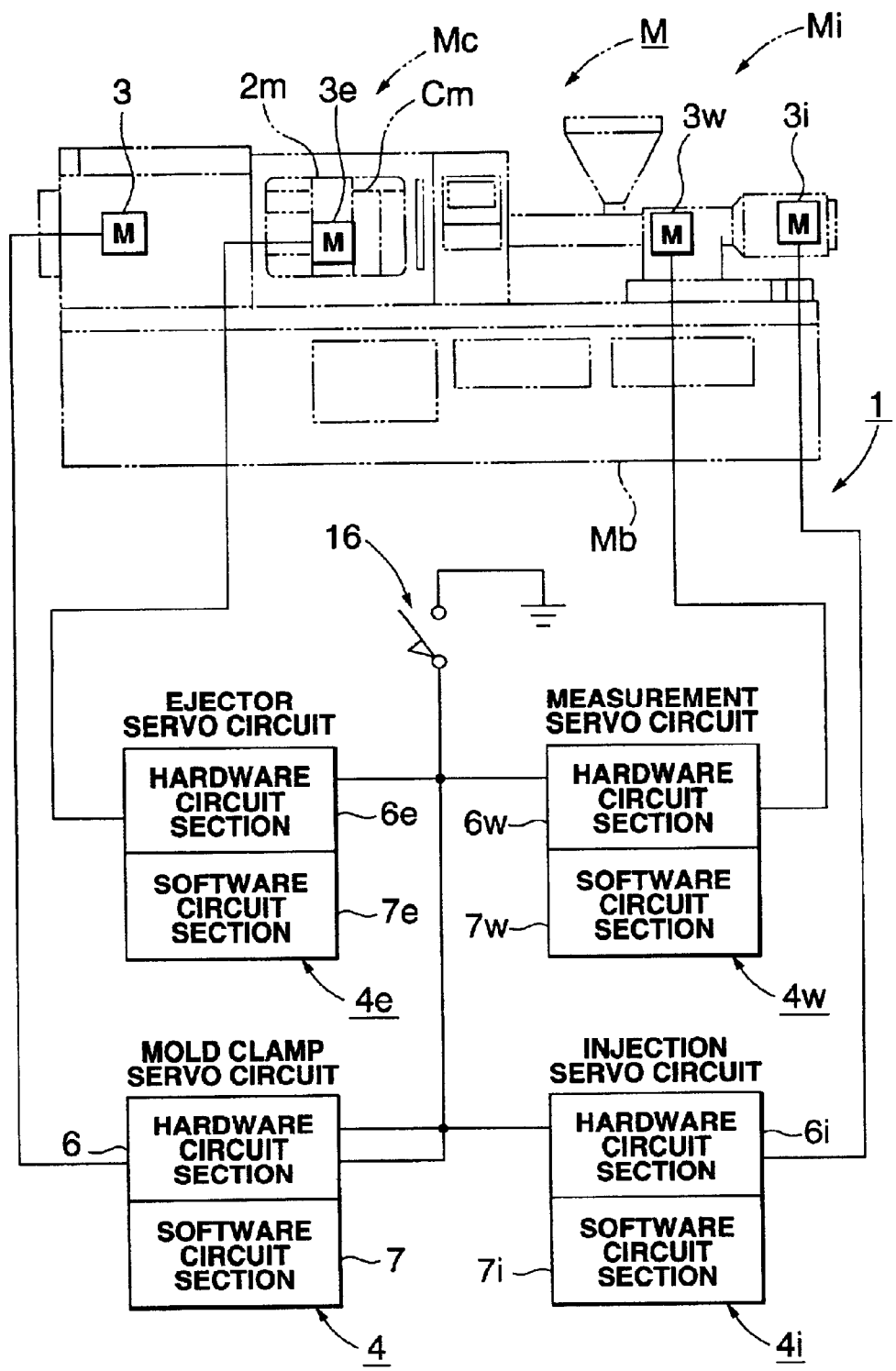
FIG. 2 is a schematic diagram of the entirety of an injection molding machine controlled by the drive control apparatus.

Meanwhile, the safety circuit section 5s is constituted by a hardware circuit section 6 realized without use of software. The hardware circuit section 6 includes a logic circuit 13; a rotational direction detection circuit 31 connected to an input terminal of the logic circuit 13; and a delay circuit 14 connected to an output terminal of the logic circuit 13. The logic circuit 13 has a plurality of input terminals and a single output terminal. A stop command signal Ss is output from the output terminal in accordance with binary data supplied to the plurality of input terminals. In the present embodiment, as shown in FIG. 2, one contact of the limit switch 16, which enters an OFF state when the door D is opened, is connected to the input terminals of the logic circuit 13, and the other contact of the limit switch 16 is grounded; i.e., is connected to a ground line (0 level). Therefore, when the safety door D is opened, a detection signal Sd ("1" signal) is input to the input terminals of the logic circuit 13. When the logic circuit 13 of the drive control apparatus 1 of the mold clamping apparatus Mc is considered to be a portion of the servo amplifier, the two input terminals of the logic circuit 13, to which one contact of the limit switch 16 is connected, correspond to an over-travel terminal for preventing rotation in the regular direction (i.e., mold closing direction) and an over-travel terminal for preventing rotation in the reverse direction (i.e., mold opening direction), respectively. Further, a cancel circuit 18 is connected to one of the two input terminals (over-travel terminal for preventing reverse rotation). By virtue of the above-described configuration, the detection signal Sd is supplied to the first input terminal (over-travel terminal for preventing reverse rotation) via the cancel circuit 18, and is supplied directly to the second input terminal (over-travel terminal for preventing regular rotation). Provision of the cancel circuit 18 enables the following operation. When a semi-automatic override mode is selected, a mode selection signal Sx is supplied to the cancel circuit 18 in order to cause the cancel circuit 18 to cancel the detection signal Sd which is supplied to the first input terminal (over-travel terminal for preventing reverse rotation) upon detection that the safety door D is opened and to supply a "0" signal to the first input terminal.

Frequency-divided signals Sao and Sbo are supplied to the rotational direction detection circuit 31. Since the phase A pulse signal Sa and the phase B pulse signal Sb output from the rotary encoder 17 are supplied to the frequency dividing section 22, the rotational direction of the servomotor 3 can be detected through composition between the frequency-divided signals Sao and Sbo output from the frequency dividing section 22. A rotational direction detection signal So output from the rotational direction detection circuit 31 is supplied to a third input terminal of the logic circuit 13. The rotational direction detection signal So may be a single-line signal or a two-line signal.

The delay circuit 14 has a function of switching the open/close switch 12 upon elapse of a preset delay time after issuance of the stop command signal Ss from the logic circuit 13. Specifically, in general, when the servo amplifier main section 21 receives a stop control signal for stopping operation of the servomotor 3, the servo amplifier main section 21 stops supply of electricity to the servomotor 3, and simultaneously supplies to a brake resistor electromotive force generated by the servomotor 3, which is rotating by means of inertia, to thereby brake the servomotor 3 electromagnetically. However, when the open/close switch 12 is brought into the OFF state by means of the stop command signal Ss. the connection between the servomotor 3 and the brake resistor, which constitute a brake circuit (dynamic brake), is broken, so that the brake circuit is disabled. In view of the foregoing, through provision of the delay circuit 14. after the brake circuit has operated over a certain period of time; i.e., after elapse of the delay time the stop command signal Ss is supplied to the open/close switch 12 in order to bring the switch 12 into the OFF state. Accordingly, the detection signal Sd output from the limit switch 16 is supplied not only to the logic circuit 13 but also to the central controller, so that the command value supplied to the servo amplifier main section 21 is changed to an emergency command value of 0 level. Thus, stop control of high response, as well as reliable stop control by means of a dual system, can be realized.

As described above the open/close switch 12 is connected in series to the signal line L. When the open/close switch 12 is brought into an ON state, the signal line L between the power driver 11 and the servo amplifier main section 21 enters an connected state, so that the drive control signal Sc is supplied to the power driver 11. When the open/close switch 12 is brought into an OFF state, the signal line L between the power driver 11 and the servo amplifier main section 21 enters a cutoff state, so that supply of electricity to the servomotor 3 can be stopped without stopping the supply of electricity to the servo amplifier main section 21.

Figure 3:
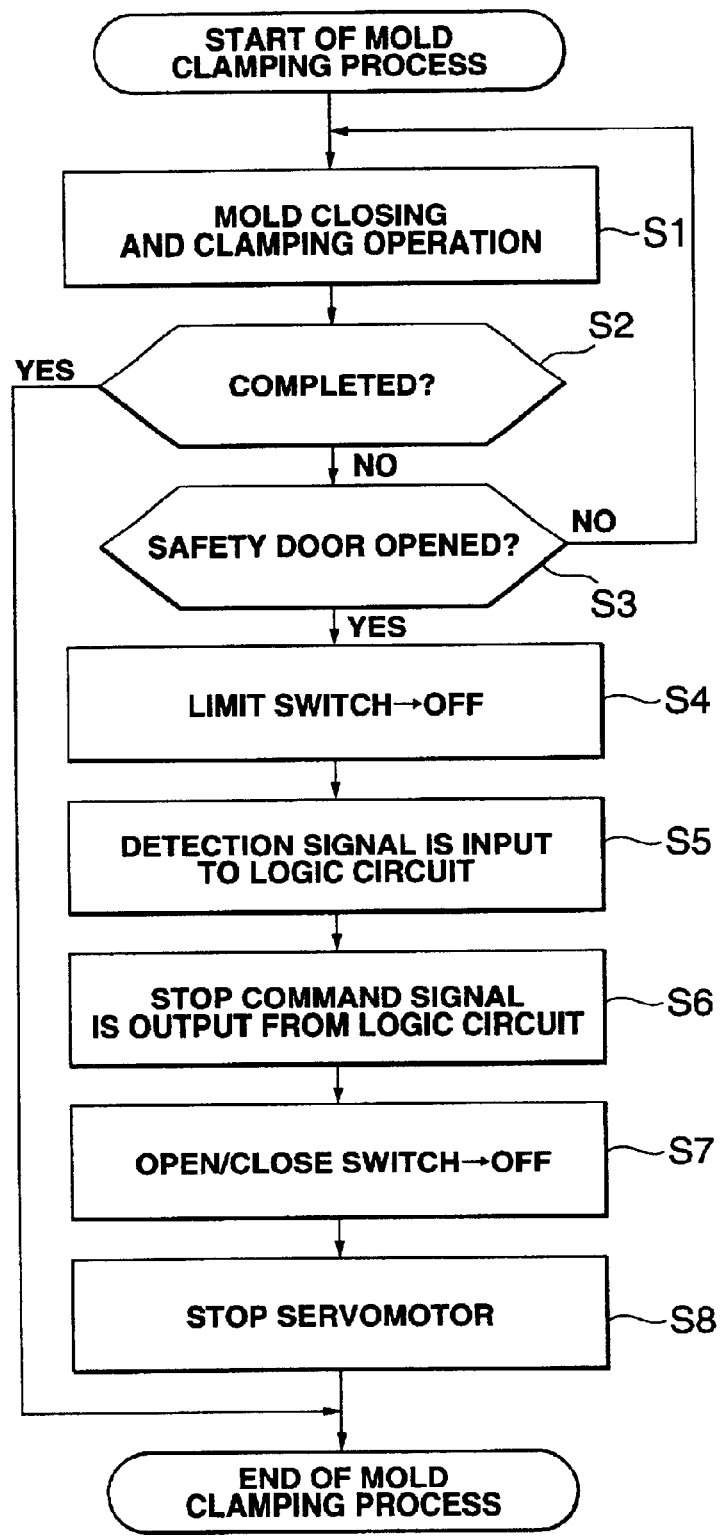
FIG. 3 is a flowchart for describing operation of the drive control apparatus.

Next, operation of the drive control apparatus 1 according to the present embodiment; in particular, operation of the mold clamping apparatus Mc shown in FIG. 1, will be described in accordance with the flowchart shown in FIG. 3 and with reference to the truth table shown in FIG. 4.

We assume that the injection molding machine M has been set to a manual mode. When an unillustrated start switch is turned on, mold closing operation and then mold clamping operation are performed in accordance with the control program (step S1). Accordingly, when the safety door D is not opened, the drive control signal Sc, which is output from the servo amplifier main section 21 on the basis of a command value and the output of the rotary encoder 17, is supplied to the power driver 11. Thus, feedback control is performed for the servomotor 3, whereby the mold closing operation and the mold clamping operation are performed in accordance with the command value (steps S1 to S3).

Next, we assume that the safety door D is opened when the mold closing operation or the mold clamping operation proceeds. When the safety door D is opened, the limit switch 16 enters the OFF state (steps S3, S4). As a result, the detection signal Sd is supplied to the input terminals of the logic circuit 13 (step S5). In the present embodiment, when the limit switch 16 enters the OFF state as shown in FIG. 2, a signal of level "1" is supplied to the two input terminals of the logic circuit 13 corresponding to the over-travel terminal for prohibiting regular rotation and the over-travel terminal for prohibiting reverse rotation, respectively, as show in FIG. 4. The rotational direction detection signal So (signal of level "1") output from the rotational direction detection circuit 31 is also supplied to the third input terminal of the logic circuit 13. On the basis of these logic signals; i.e., the signal of level "1" supplied to the over-travel terminal for prohibiting regular rotation and the rotational direction detection signal So (signal of level "1"), the logic circuit 13 outputs a stop command signal Ss (signal of level "1") from its output terminal (step S6). This stop command signal Ss is supplied to the open/close switch 12, whereby the open/close switch 12 is switched to OFF (step S7). As a result, the signal line L is broken, and the power driver 11 stops the operation of the servomotor 3 (step S8).

At this time, as described above, the detection signal Sd output from the limit switch 16 is supplied not only to the logic circuit 13 and but also to the central controller; and the stop command signal Ss output from the logic circuit 13 is delayed by a delay time Td by means of the delay circuit 14. Therefore, the command value supplied to the servo amplifier main section 21 is first changed to an emergency command value so as to quickly step the servomotor 3 by means of the brake circuit of the servo amplifier main section 21. Thereafter, the open/close switch 12 is switched to OFF. Therefore, stop control of high response and reliable stop control by means of the dual system are realized.

In the above-described embodiment, a mold clamping process in a manual mode has been described. As shown in FIG. 4, since the rotational direction detection signal So assumes the "0" level in a manual-mode mold opening process, the stop command signal Ss is output on the basis of the signal of level "1" supplied to the over-travel terminal for prohibiting reverse rotation. The same operation as that performed in the above-described manual mode is performed in an automatic mode and a semi-automatic normal mode, as well. However, in a semi-automatic override mode, since a changeover signal Sx is supplied to the cancel circuit 18, the signal of level "1" is cancelled, and a signal of level "0" is supplied to the over-travel terminal for prohibiting reverse rotation during the mold opening process. As a result, during the mold opening operation in the semi-automatic override mode, even when the safety door D is opened, the open/close switch 12 is maintained ON in order to permit manual mold opening.

The embodiment exemplifies the case in which the movable platen 2m of the mold clamping apparatus Mc serves as a movable member 2. However, the present invention can be applied to an ejector pin (movable member 2) provided in the mold unit C and a screw (movable member 2) provided in an injection apparatus Mi. In FIG. 2, reference numeral 4e denotes a servo circuit for driving and controlling a servomotor 3e which moves the ejector pin provided in the mold unit C; 4w denotes a servo circuit for driving and controlling a servomotor 3w which rotates the screw provided in the injection apparatus Mi; and 4i denotes a servo circuit for driving and controlling a servomotor 3i which reciprocates the screw. Like the above-described servo circuit 4, the servo circuits 4e, 4w, and 4i are formed by hardware circuit sections 6e, 6w, and 6i and software circuit sections 7e, 7w, and 7i, respectively. Since the hardware circuit sections 6e, 6w, and 6i do not require the above-described semi-automatic override mode, the number of input terminals of the logic circuit 13 for receiving the detection signal Sd from the limit switch 16 is one. Although not shown in the drawings, the present invention can be applied similarly to a servo circuit which drives and controls a servomotor for moving a core (movable member 2) provided in the mold unit C.

In the drive control apparatus 1 according to the present embodiment, the functional section 5 having a higher degree of importance; i.e., the safety circuit section 5s, is constituted by the hardware circuit section 6 realized without use of software. Therefore, occurrence of erroneous operation due to external noise, program bugs, runaway of a CPU, and the like can be avoided, whereby safety and reliability are remarkably enhanced.

While the present invention has been described with reference to the preferred embodiment, the present invention is not limited thereto. Regarding structural details and methods among others, modifications and any omission or addition may be possible as needed without departing from the scope of the invention. For example, the safety circuit 5s that operates upon opening of the safety door D has been exemplified as a functional section having a higher degree of importance. However, the functional section having a higher degree of importance may be a safety circuit section having a different configuration, or a circuit other than the safety circuit. Further, a plurality of functional sections 5 may be determined to have a higher degree of importance. Moreover, provision of the delay circuit 14 is not always required.

What is claimed is:

1. A drive control apparatus used in an injection molding machine in order to drive and control a servomotor for moving a movable member, compromising:
    a plurality of functional sections which constitute a servo circuit connected to the servomotor, at least one of the functional sections being constituted by a hardware circuit section which operates independently of a computer software program; and remaining one or ones of the functional sections being constituted by a software circuit section operating in accordance with the computer software program.

2. The drive control apparatus used in an injection molding machine according to claim 1, wherein the at least one of the functional sections constituted by the hardware section includes a safety circuit section which detects that a safety door is opened and subsequently stops operation of the servomotor.

3. The drive control apparatus used in an injection molding machine according to claim 2, wherein the safety circuit section includes an open/close switch connected in series to a signal line which supplies a drive control signal to a power diver for supplying electricity to the servomotor; and a logic circuit which outputs a stop command signal upon receipt of a detection signal generated when the safety door is opened, and changes over the open/close switch by means of the stop command signal.

4. The drive control apparatus used in an injection molding machine according to claim 3, wherein the logic circuit has a plurality of input terminals and a single output terminal.

5. The drive control apparatus used in an injection molding machine according to claim 4, wherein the detection signal generated when the safety door is opened is directly supplied to one of the input terminals of the logic circuit.

6. The drive control apparatus used in an injection molding machine according to claim 4, wherein the detection signal generated when the safety door is opened is supplied to one of the input terminals of the logic circuit via a cancel circuit.

7. The drive control apparatus used in an injection molding machine according to claim 4, wherein a rotational direction detection signal generated upon detection of the rotational direction of the servomotor is supplied to one of the input terminals of the logic circuit.

8. The drive control apparatus used in an injection molding machine according to claim 3. wherein the safety circuit section includes a delay circuit for changing over the open/close switch upon elapse of a predetermined delay time after the logic circuit has output the stop command signal.

9. The drive control apparatus used in an injection molding machine according to claim 1, wherein the remaining one or ones of the functional sections include a servo amplifier main section for supplying a drive control signal to a power driver which supplies electricity to the servomotor.

10. The drive control apparatus used in an injection molding machine according to claim 1, wherein the movable member is a movable platen provided in a mold clamping apparatus.

11. The drive control apparatus used in an injection molding machine according to claim 1, wherein the movable member is a core provided in a mold unit.

12. The drive control apparatus used in an injection molding machine according to claim 1, wherein the movable member is an ejector pin provided in a mold unit.

13. The drive control apparatus used in an injccfion molding machine according to claim 1, wherein tbe movable member is a screw provided in an injection apparatus.

14. The drive control apparatus used in an injection molding machine according to claim 1, wherein the at least one of the functional sections constituted by the hardware circuit stops operation of the servomotor during an unsafe condition, even when the remaining one or ones of the functional sections operating under control of the computer software program are not functioning properly.

* * * * *